Figure 3:
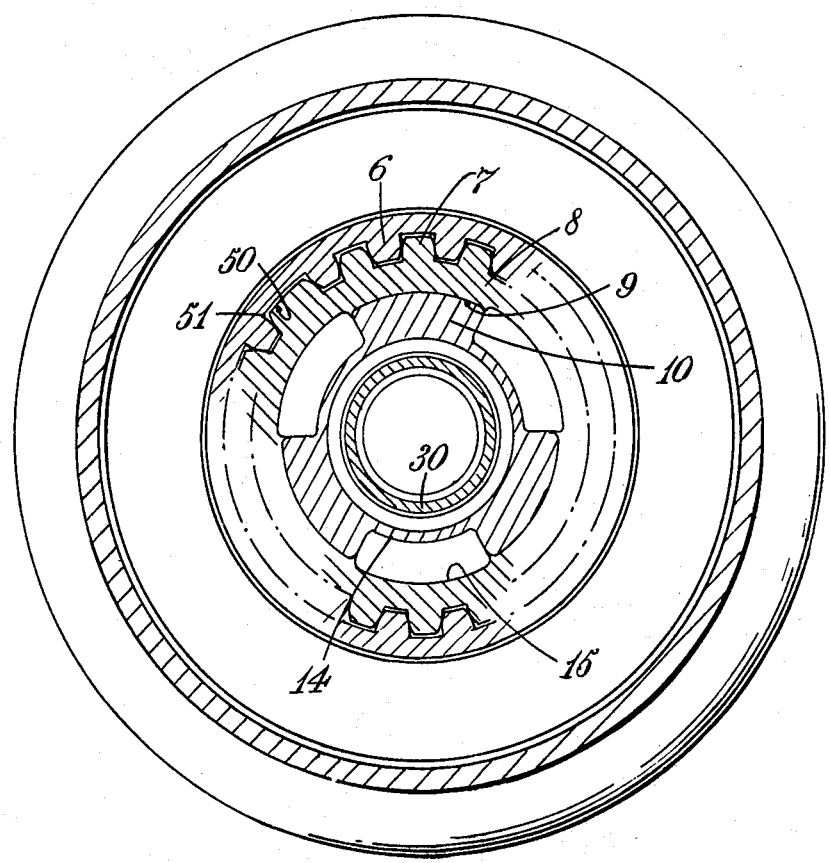

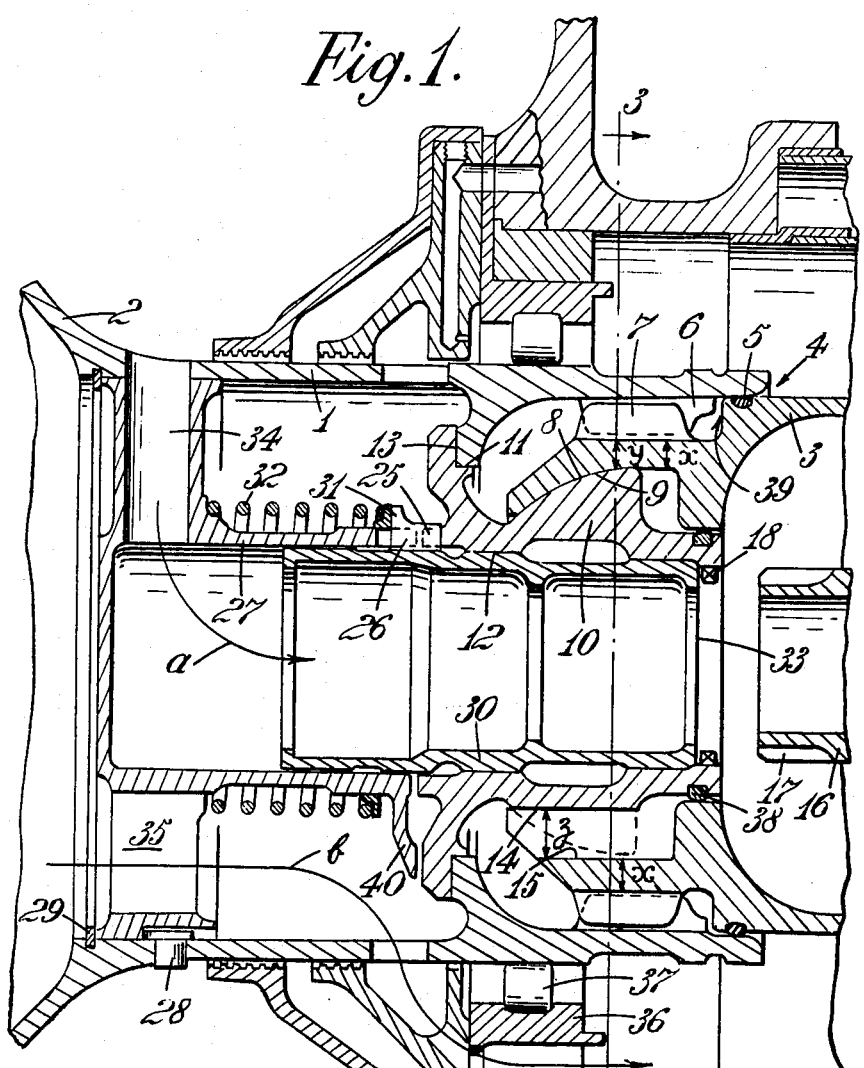
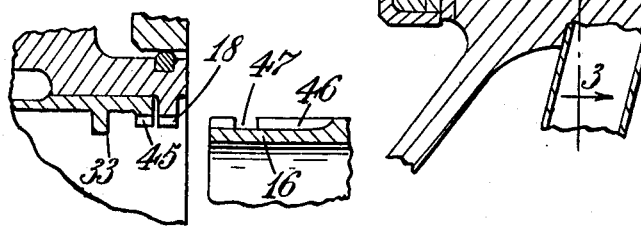

May 8, 1956     B. S. MASSEY ET AL     2,744,395
SHAFT COUPLING

Filed June 18, 1953     2 Sheets-Sheet 2

INVENTORS
B. S. MASSEY &
D. G. BUSH
BY
Wilkinson & Mawhinney
ATTYS.

United States Patent Office 2,744,395
Patented May 8, 1956

---

2,744,395

SHAFT COUPLING

Bernard Sidney Massey and Denis George Bush, Bristol, England, assignors to The Bristol Aeroplane Company Limited, Bristol, England, a British company Application June 18, 1953, Serial No. 362,632

Claims priority, application Great Britain June 23, 1952

8 Claims. (Cl. 64—9)

---

This invention relates to shaft couplings and concerns shaft couplings of the kind for connecting together two shafts subject to slight misalignment, one at least of which shafts is hollow, and comprising internally and externally toothed parts fixed or formed on the two shafts respectively and in rotational driving engagement with one another while permitting slight angular misalignment, one of the adjacent shaft ends carrying a part-spherical surface mating in overlapping relation with a complementary part-spherical surface on a member attached to the other adjacent shaft end in a manner permitting rotation but not axial withdrawal in relation thereto, the parts carrying the mating surfaces being cut away sufficiently to allow these surfaces to be brought together axially and then locked against withdrawal by partial rotation of the rotatable member, and means extending through the hollow shaft for effecting such partial rotation and for locking the rotatable member against undesired rotation relatively to the shafts.

According to the present invention in a coupling of the kind referred to above said means extending through the hollow shaft is formed in two parts one of which comprises a tool which is adapted partially to rotate the rotatable member, and is removable after the assembly of the coupling, and the other of which is assembled with the coupling and is adapted to lock the rotatable member against rotation relatively to the shafts when said part spherical surfaces have been brought together axially and have been so located relative to one another as to prevent axial separation of the shafts by rotation of the rotatable member, said tool unlocking the rotatable member before partial rotation to uncouple the coupling.

This improvement or modification effects a reduction in the weight of the coupling, especially in applications in which the hollow shaft is of considerable length, and also in some instances a reduction in cost, since it will not normally be necessary to supply a separate tool part for each assembly. This is especially so in the case where the couplings are used in so-called "expendable" units.

According to a feature of the present invention the rotatable member may be locked against rotation relatively to the shafts by an axially slidable toothed clutch member adapted to engage corresponding teeth on the rotatable member and on one of the shafts, and said clutch member may be urged into its locking position by a spring and may be directly or indirectly engageable by said tool for axial movement against the action of said spring to unlock the rotatable member.

Preferably, the rotatable member is lockable on its shaft by said clutch member in a number of positions in which said part spherical surfaces may be brought together axially, and in a number of positions in which the part spherical surfaces are located against axial separation so that said rotatable member may be locked to its shaft with the coupling coupled or uncoupled.

According to another feature of the invention means may be provided preventing withdrawal of the tool except when the coupling is coupled.

According to another feature of the present invention said part-spherical surfaces may be shaped and arranged to permit axial movements of the shafts towards each other under compressive forces urging the shafts together, and there may be provided abutment surfaces on the shafts to limit such axial movement of the shafts towards each other.

Two embodiments of the present invention will now be described with reference to the accompanying drawings, whereof:

Figure 1 is a cross-section of a coupling in accordance with the present invention, Figure 2 is a partial view in cross-section of a modified part of the coupling shown in Figure 1, and Figure 3 is a cross-section on line 3—3 of Figure 1.

In the drawings, Figures 1 and 2 show a coupling forming part of a gas turbine engine. Referring to Figure 1, a shaft 1 is connected by a conical part 2, partly shown, to a compressor rotor, and a hollow shaft 3 is connected to a turbine rotor. The shafts 1 and 3 overlap at 4 with the interposition of a resilient sealing member 5. Adjacent such overlapping parts the shafts are provided with mutually engaging teeth 6, 7 adapted to transmit torque while permitting slight angular misalignment. The shaft 3 is further provided with an inwardly-directed part-spherical surface 8 mating in overlapping relation with a complementary outwardly-directed part-spherical surface 9 on a member 10 which is mounted in the shaft 1 in a manner permitting rotation about journal surfaces 11 and 12 but not axial withdrawal, this being prevented by thrust surfaces 13. The surfaces 8 and 9 are parts of hemispheres the centre of which lies approximately in the midplane of the teeth 6, 7. The member 10 and the overlapping part of the shaft 3 are cut away as at 14 and 15 (see Figure 3) over three equally spaced sectors each subtending 60° at the axis so that by rotating the member 10 through 60° relatively to the shafts the overlapping parts can be engaged or disengaged. Such rotation is effected by a tool 16 inserted through the hollow shaft 3 and having recesses 17 to engage teeth 18 on the member 10.

To effect locking of the rotatable member 10 relatively to its shaft 1 it is provided with a ring of clutch teeth 25 lying in opposition to a similar ring of teeth 26 on a core member 27 lodged in the bore of the shaft 1. The core member is located against rotation and axial movement to the right by three equally spaced studs 28 and against axial movement to the left by a spring clip 29. Slidably mounted within the members 10 and 27 and, therefore, supported for sliding movement from the shaft 1 is a clutch member 30 provided with teeth 31 which project outwardly between the teeth on the parts 10 and 27 so as to lock these two parts against relative rotation, the teeth 26 are however made at least as long as the teeth 31 so that by sliding the clutch member 30 to the left against the action of a spring 32 the teeth 31 can be disengaged from the teeth 25 and the member 10 freed for rotation. To permit such displacement of the clutch member 30 by a tool 16, the member is extended to the right to provide an abutment face 33 against which the tool 16 presses as it is inserted. The clutch member 30 is made hollow so that it can serve as a passage for air serving to cool the turbine rotor, such air being admitted from the compressor outlet through one or more radial passages 34 formed in the core member 27 as indicated by the arrow a. The core member is also provided with one or more axial passages 35 for air tapped off from the compressor at an intermediate pressure stage and therefore at a lower temperature, such air being employed to prevent overheating of the bearings of the assembly. After passing through the passage 35 this air follows the line of the arrow b, passing over the outside of the race 36 of a bearing 37 supporting the shaft 1 and then being conveyed to the turbine bearing housing, not shown on the drawing. Mixing of the two airflows is prevented by the seal 5 and a further seal 38 between the shaft 3 and the member 10. These seals also serve to retain grease, with which the joint is packed during assembly.

The teeth 31, and therefore the slots between the teeth 25 and 26 are spaced at intervals of 60°, i. e. at half the spacing of the spherically surfaced portions of the rotatable member 10 and the shaft 3, so that the latter two parts may be locked together either in the number of positions in which the spherical surfaces are so located as to prevent axial separation of the shafts 1 and 3, or in the number of positions in which they may be brought together axially for interlocking.

The torque transmission teeth 6 and 7 comprise a master tooth and recess 50, 51 to ensure that the shafts 1 and 3 are only engageable in one angular relation.

As may be seen from Figure 1, the part-spherical surface 8 has its centre of curvature on the axis of the shaft 3 and lies on one side of the plane normal to the axis of the shaft 3 and containing this centre. The shafts 1 and 3 are, therefore, free to move towards each other under the action of axial compression forces which might develop between the shafts, due for example to the weight of the parts when the assembly is tilted from the horizontal. This axial movement which takes up the clearance 39 between the shaft 3 and the ends of the teeth 6 is limited by the opposed abutment faces formed by the end faces of the teeth 6 and a shoulder on the shaft 3, and when the clearance 39 closes, the thrust is transmitted between the end faces of the teeth 6 and the shoulder. Projections 40 on the part 27 facilitate assembly but are not intended to transmit thrust.

If desired, means may be provided to ensure that the tool 16 is not withdrawable except when the spherical coupling surfaces are engaged. Thus, for example, the tool 16 and clutch member 30 may be modified as shown in Figure 2, the clutch member being provided with a baulking ring 45 having three grooves through which the splines 46 of the tool can pass when this latter is inserted, a groove 47 in the tool then permitting the latter to be turned to effect disengagement of the spherical surfaces 8 and 9; the tool cannot, however, be withdrawn until turned through 120° or back to its original position, in both of which positions the coupling is locked.

We claim:

1. A coupling for connecting together two shafts subject to slight misalignment, one at least of which shafts is hollow, said coupling comprising internally and externally toothed parts fixedly carried on the two shafts respectively, said toothed parts being in rotational driving engagement with one another while permitting slight angular misalignment between the shafts, a first coupling part fixedly carried by one of the shafts at its end adjacent the other shaft, said first coupling part having a part spherical surface, a second coupling part attached to the other shaft at its end adjacent the first said shaft in a manner permitting rotation relatively to said shafts but not axial withdrawal in relation to said other shaft, said second coupling part having a complementary part spherical surface in overlapping relationship with the part spherical surface of said first coupling part, and said first and second coupling parts being cut away in a manner allowing said part spherical surfaces to be moved axially into said overlapping relationship and then locked against withdrawal from their overlapping relationship by partial rotation of the second coupling part relatively to the shafts, toothed means on said second coupling part engageable by a tool inserted through said hollow shaft to rotate said second coupling part and locking means located within a hollow end portion of, and carried by, one of said shafts at its end adjacent the other shaft, for releasably locking said second coupling part against rotation relatively to said shafts at least when said first and second coupling parts are locked against withdrawal from their overlapping relationship, said locking means including a slidable member movable between an operative position in which said second coupling part and said first coupling part are locked against withdrawal from their overlapping relationship and an inoperative position in which said second coupling part is free to rotate relatively to said shafts, and resilient means urging said slidable member into its operative position, said slidable member having a surface engageable by a tool inserted through said hollow shaft to rotate said second coupling part to move said slidable member to its inoperative position against the action of said resilient means and thereby free said second coupling part for rotation by the tool.

2. A coupling as claimed in claim 1 wherein the part-spherical surface on said first coupling part is an inwardly directed surface having its centre of curvature on the axis of said one shaft, the surface lying on one side of the plane normal to said axis and containing said centre, and there is provided a pair of opposed abutment faces, one on each of said shafts, to limit the axial movement of said shafts towards each other.

3. A coupling for connecting together two shafts subject to slight misalignment, one at least of which shafts is hollow, said coupling comprising internally and externally toothed parts fixedly carried on the two shafts respectively, said toothed parts being in rotational driving engagement with one another while permitting slight angular misalignment between the shafts, a first coupling part fixedly carried by one of the shafts at its end adjacent the other shaft, said first coupling part having a part-spherical surface, a second coupling part attached to the other shaft at its end adjacent the first said shaft in a manner permitting rotation relatively to said shafts but not axial withdrawal in relation to said other shaft, said second coupling part having a complementary part-spherical surface in overlapping relationship with the part-spherical surface of said first coupling part, said first and second coupling parts being cut away in a manner allowing said part-spherical surfaces to be moved axially into said overlapping relationship and then locked against withdrawal from their overlapping relationship by partial rotation of the second coupling part relatively to the shafts, first toothed means on said second coupling part, second toothed means on one of said shafts, a toothed clutch member, means supporting said toothed clutch member from one of said shafts for sliding movement axially of and within the shaft between an operative position in which the teeth on said clutch member engage between teeth of said first toothed means and teeth of said second toothed means to lock said second coupling part against rotation relatively to said shafts and an inoperative position in which said second coupling part is free to rotate relatively to said shafts, an abutment on said one of said shafts from which said clutch member is supported for sliding movement, and a spring engaged between said abutment and said clutch member and urging said clutch member into its operative position.

4. A coupling for connecting together two shafts subject to slight misalignment, one at least of which shafts is hollow, said coupling comprising internally and externally toothed parts fixedly carried on the two shafts respectively, said toothed parts being in rotational driving engagement with one another while permitting slight angular misalignment between the shafts, one of said toothed parts having a master tooth larger than the other teeth of the part, and the other of said toothed parts having a master recess between two of its adjacent teeth, which master recess is larger than the other recesses between adjacent teeth of said other of the toothed parts and receives said master tooth, the master tooth and recess ensuring that the two shafts are always coupled together in the same angular relationship, a first coupling part fixedly carried by one of the shafts at its end adjacent the other shaft, said first coupling part having a part spherical surface, a second coupling part attached to the other shaft at its end adjacent the first said shaft in a manner permitting rotation relatively to said shafts but not axial withdrawal in relation to said other shaft, said second coupling part having a complementary part spherical surface in overlapping relationship with the part spherical surface of said first coupling part, said first and second coupling parts being cut away in a manner allowing said part spherical surfaces to be moved axially into said overlapping relationship when they are in a number of different angular positions relatively to one another and then locked against withdrawal from their overlapping relationship in an equal number of different angular positions relatively to one another by partial rotation of the second coupling part relatively to the shafts, first toothed means on said second coupling part, second toothed means on said other of said shafts, said first and second toothed means each having twice as many teeth as there are relative angular positions at which said spherical surfaces can be moved axially into overlapping relationship, a toothed clutch member, means supporting said toothed clutch member from said other of said shafts for sliding movement axially of and within the shaft between an operative position in which the teeth of said clutch member engage between teeth of said first tooth means and teeth of said second tooth means to lock said second coupling part against rotation relatively to said other of said shafts in all of its position in which its part spherical surface can be moved axially into overlapping relationship with the corresponding part spherical surface of said first coupling part and in all of its positions in which it is locked against withdrawal from its overlapping relationship with said first coupling part, and an inoperative position in which said second coupling part is free to rotate on said other shaft, an abutment on said other of said shafts, and a spring engaged between said abutment and said clutch member and urging said clutch member into its operative position.

5. A coupling for connecting together two shafts subject to slight misalignment, one at least of which shafts is hollow, said coupling comprising internally and externally toothed parts fixedly carried on the two shafts respectively, said toothed parts being in rotational driving engagement with one another while permitting slight angular misalignment between the shafts, a first coupling part fixedly carried by one of the shafts at its end adjacent the other shaft, said first coupling part having a part spherical surface, a second coupling part attached to the other shaft at its end adjacent the first said shaft in a manner permitting rotation relatively to said shafts but not axial withdrawal in relation to said other shaft, said second coupling part having a complementary part spherical surface in overlapping relationship with the part spherical surface of said first coupling part, said first and second coupling parts being cut away in a manner allowing said part spherical surfaces to be moved axially into said overlapping relationship and then locked against withdrawal from their overlapping relationship by partial rotation of the second coupling part relatively to the shafts, first toothed means on said second coupling part, second toothed means on said other of said shafts, a toothed clutch member, means supporting said toothed clutch member from said other of said shafts for sliding movement axially of and within the shaft between an operative position in which the teeth on said clutch member engage between teeth of said first tooth means and teeth of said second toothed means to lock said second coupling part against rotation relatively to said other shaft and an inoperative position in which said second coupling part is free to rotate relatively to said other shaft, an abutment on said other shaft, and a spring engaged between said abutment and said clutch member and urging said clutch member into its operative position.

6. A coupling for connecting together two shafts subject to slight misalignment, one at least of which shafts is hollow, said coupling comprising internally and externally toothed parts fixedly carried on the two shafts respectively, said toothed parts being in rotational driving engagement with one another while permitting slight angular misalignment between the shafts, a first coupling part fixedly carried by one of the shafts at its end adjacent the other shaft, said first coupling part having an inwardly-directed part spherical surface, a second coupling part attached to the other shaft at is end adjacent the first said shaft in a manner permitting rotation relatively to said shafts but not axial withdrawal in relation to said other shaft, said second coupling part having a complementary outwardly-directed part spherical surface in overlapping relationship with the part spherical surface of said first coupling part, said first and second coupling parts being cut away in a manner allowing said part spherical surfaces to be moved axially into said overlapping relationship and then locked against withdrawal from their overlapping relationship by partial rotation of the second coupling part relatively to the shafts, first toothed means on said second coupling part, second toothed means on said other of said shafts, a toothed clutch member carried in a bore in said second coupling part for sliding movement axially of said other shaft between an operative position in which the teeth on said clutch member engage between teeth of said first tooth means and teeth of said second toothed means to lock said second coupling part against rotation relatively to said other shaft and an inoperative position in which said second coupling part is free to rotate relatively to said other shaft, an abutment on said other shaft, and a spring engaged between said abutment and said clutch member and urging said clutch member into its operative position.

7. A coupling for connecting together two shafts subject to slight misalignment one at least of which shafts is hollow, said coupling comprising internally and externally toothed parts fixedly carred on the two shafts respectively, said toothed parts being in rotational driving engagement with one another while permitting slight angular misalignment between the shafts, a first coupling part fixedly carried by one of the shafts at its end adjacent the other shaft, said first coupling part having a part-spherical surface, a second coupling part attached to the other shaft at its end adjacent the first said shaft in a manner permitting rotation relatively to said shafts but not axial withdrawal in relation to said other shaft, said second coupling part having a complementary part-spherical surface in overlapping relationship with the part spherical surface of said first coupling part, said first and second coupling parts being cut away in a manner allowing said part spherical surfaces to be moved axially into said overlapping relationship and then locked against withdrawal from their overlapping relationship by partial rotation of the second coupling part relatively to the shafts, first toothed means on said second coupling part, second toothed means on one of said shafts, a toothed clutch member, means supporting said toothed clutch member from one of said shafts for sliding movement axially of and within the shaft between an operative position in which the teeth on said clutch member engage between teeth of said first toothed means and teeth of said second toothed means to lock said second coupling part against rotation relatively to said shafts and an inoperative position in which said second coupling part is free to rotate relatively to said shafts, an abutment on said one of said shafts from which said clutch member is supported for sliding movement, and a spring engaged between said abutment and said clutch member and urging said clutch member into its operative position, means providing an abutment face on said toothed clutch member whereby said clutch member may be moved to its inoperative position against the action of said spring by a tool inserted through said hollow shaft to rotate said second coupling part, and baulking means carried by said toothed clutch member in front of said abutment face, said baulking means preventing a tool inserted through said hollow shaft to rotate said second coupling part from being moved into and out of engagement with said abutment face except when said second coupling part is locked against withdrawal from its overlapping relationship with said first coupling part.

8. A coupling for connecting together two shafts subject to slight misalignment, one at least of which shafts is hollow, said coupling comprising internally and externally toothed parts fixedly carried on the two shafts respectively, said toothed parts being in rotational driving engagement with one another while permitting slight angular misalignment between the shafts, a first coupling part fixedly carried by one of the shafts at its end adjacent the other shaft, said first coupling part having a part spherical surface, a second coupling part attached to the other shaft at its end adjacent the first said shaft in a manner permitting rotation relatively to said shafts but not axial withdrawal in relation to said other shaft, said second coupling part having a complementary part spherical surface in overlapping relationship with the part spherical surface of said first coupling part, said first and second coupling parts being cut away in a manner allowing said part spherical surfaces to be moved axially into said overlapping relationship and then locked against withdrawal from their overlapping relationship by partial rotation of the second coupling part relatively to the shafts, toothed means on said second coupling part engageable by a tool inserted through said hollow shaft to rotate said second coupling part and locking means located within a hollow end portion of, and carried by, one of said shafts at its end adjacent the other shaft, for releasably locking said second coupling part against rotation relatively to said shafts at least when said first and second coupling parts are locked against withdrawal from their overlapping relationship said locking means including a slidable member movable between an operative position in which said second coupling part and said first coupling part are locked against withdrawal from their overlapping relationship and an inoperative position in which said second coupling part is free to rotate relatively to said shafts, and resilient means urging said slidable member into its operative position, said slidable member having a surface engageable by a tool inserted through said hollow shaft to engage said slidable member after said toothed means has been engaged to move said slidable member to inoperative position.

References Cited in the file of this patent

UNITED STATES PATENTS

| | | |
|---|---|---|
| 2,525,695 | Lombard | Oct. 10, 1950 |
| 2,565,558 | Highberg | Aug. 28, 1951 |
| 2,696,346 | Marchant et al. | Dec. 7, 1954 |

FOREIGN PATENTS

| | | |
|---|---|---|
| 630,919 | Great Britain | Oct. 24, 1949 |